July 9, 1968 — E. G. KAUFMAN — 3,391,971
FOLDABLE CARDBOARD THREE DIMENSIONAL VIEWER
Filed March 20, 1964
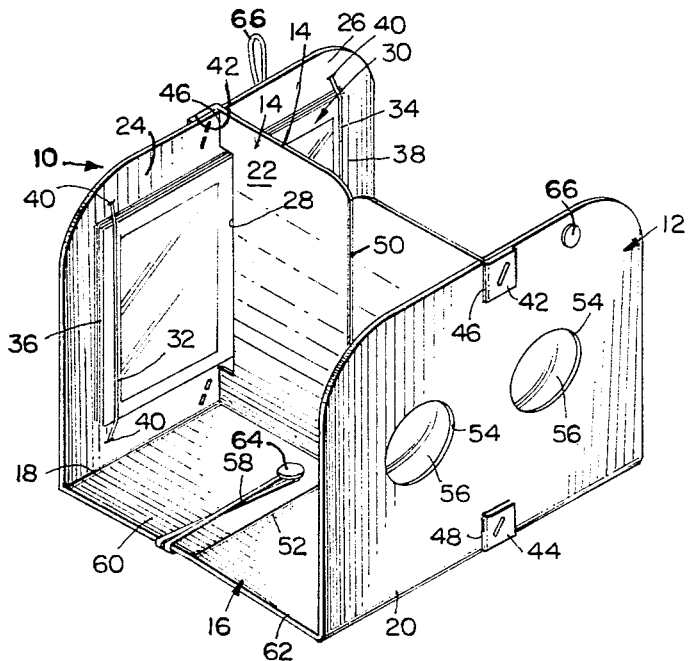
FIG.1
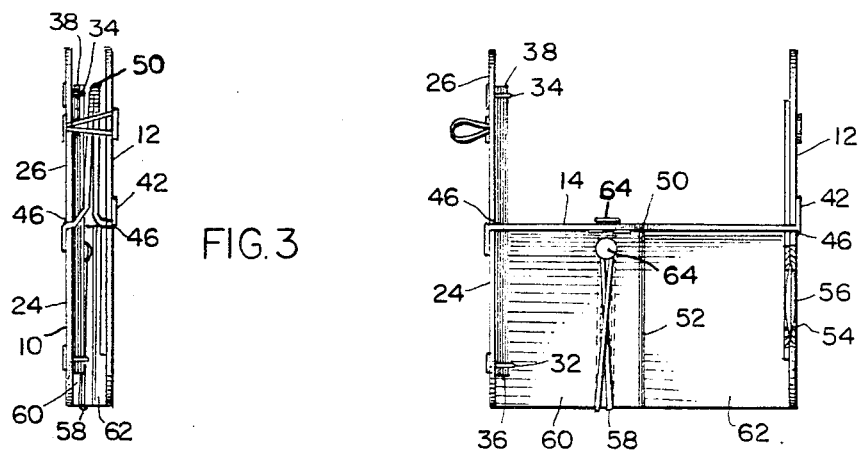
FIG.2
FIG.3
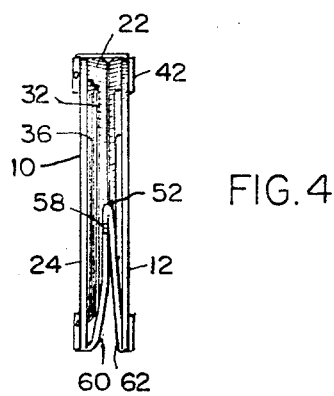
FIG.4
INVENTOR
ELI G. KAUFMAN
BY,
Ezekiel Wolf, Wolf & Greenfield
ATTORNEYS United States Patent Office 3,391,971
Patented July 9, 1968

3,391,971
FOLDABLE CARDBOARD THREE DIMENSIONAL VIEWER
Eli G. Kaufman, 200 Congress Ave., Chelsa, Mass. 02150
Filed Mar. 20, 1964, Ser. No. 353,469
3 Claims. (Cl. 350—140)

ABSTRACT OF THE DISCLOSURE

A three dimensional viewer is provided for superimposing substantially identical images in positive photographic prints to produce a three dimensional effect and comprises an image support panel and front panel spaced in front of the support panel through which the support panel may be viewed. A foldable spacer interconnects the support and viewer panels and when folded collapses the viewer by bringing the support and viewer panels in close parallel proximity to one another and when in an unfolded position the spacer spaces the panels a predetermined distance apart and divides the support panel into independent viewable fields. Biasing means are attached to the spacer for resiliently biasing the viewer into the unfolded position.

---

Heretofore substantially all three dimensional photography for mass use has used transparencies as the image-carrying medium, and consequently those pictures taken for three dimensional viewing have been restricted to observation through viewers. However, transparencies need not be used to produce a three dimensional effect and positive prints can be used for this purpose. Because the prints may be enjoyed alone without the aid of special viewers or other equipment as two dimensional pictures, they have a distinct advantage over transparencies. But, heretofore, there has not been available an inexpensive viewer for use with positive prints so that they may alternately be enjoyed as two and three dimensional pictures.

One important object of this invention is to provide a viewing device suitable for displaying two substantially identical two dimensional positive figures to provide for the observer an additional dimension when the two are viewed simultaneously.

Another important object of this invention is to provide a viewing device which may be folded so as to comprise a flat object which may easily be carried in the pocket or purse.

Yet another important object of this invention is to provide a viewer which may serve as a carrier for several pictures to be viewed separately in it.

Yet another important object of this invention is to provide an inexpensive viewer which magnifies a positive print observed through it.

To accomplish these and other objects this invention includes among its important features a rear support panel and a front viewer panel interconnected by a spacer which collapses. When collapsed the spacer brings the two panels in very close proximity to one another with the spacer between them. When the spacer is unfolded the two panels are set a predetermined distance apart to place the pictures mounted on the support panel in focus when viewed through the front panel.

These and other objects and features of this invention will be better understood and appreciated from the following detailed description of one embodiment thereof, selected for purposes of illustration and shown in the accompanying drawing, in which:

FIG. 1 is a perspective view showing the viewer of this invention;

FIG. 2 is a top view of the viewer shown in FIG. 1;

FIG. 3 is a top view of the viewer showing it in the collapsed form; and

FIG. 4 is a side view of the collapsed viewer.

The viewer shown in the drawing includes an object support rear panel 10, a front panel 12 through which the panel 10 is viewed, a spacer panel 14 extending between the front panel 12 and the rear or object support panel 10, and a bottom panel 16 confined to one side of the spacer panel 14. In the preferred form of this invention the panels 10, 12, 14 and 16 are made of an extremely inexpensive material such as corrugated cardboard which, though inexpensive, retains its shape, is quite stiff and can be refolded along scored lines a great number of times without breaking. While such material as corrugated cardboard is preferred, it is to be understood that other materials may be used and the invention is not limited to a specific material.

The rear panel 10 like the other panels is generally rectangular in shape, and it is connected along its bottom edge 18 to the bottom panel 16 that in turn is connected to the bottom edge 20 of the front panel 12. The panel 10 is bisected by the rear edge 22 of the spacer panel 14 so that the panel 10 has two separate and distinct viewing fields 24 and 26. The two fields 24 and 26 are connected to one another by means of a slot 28 provided between the rear edge 22 of the spacer panel 14 and the front face of the panel 10.

The slot 28 enables a picture to be mounted on the front face of the panel 10 and extend over both fields 24 and 26. Thus, in FIG. 1 a picture 30 is shown supported on the panel 10 and extends through the slot 28 so that it lies half on the field 24 and half on the field 26. The picture 30 is retained on the panel 10 by means of a pair of bands 32 and 34 adjacent the side edges 36 and 38, respectively of the picture 30. If the device is to be made as inexpensively as possible, the bands 32 and 34 may be made of elastic and extend through slits 40 provided in the panel 10 and be clipped on the rear sides by any form of convenient fastener.

The print 30 shown mounted on the rear panel 10 carries a pair of substantially identical pictures. The two pictures may be taken by a camera having means for taking the pictures from points a few inches apart. Such prints could either be bought commercially or be taken by the owner of the viewer who has a camera capable of taking such pictures.

The spacer panel 14 may be secured to the rear panel 10 and front panel 12 by tabs 42 and 44 provided at the top and bottom of the side edges of the spacer panel 14. The tabs 42 and 44 extend through slots 46 and 48 cut in the top and bottom of the rear and front panels 10 and 12 and are folded over and secured in place by means of staples or other fasteners. Thus, the spacer 14 is firmly secured to the two panels and limits the distance that they may be separated from one another.

The spacer panel 14 is provided with a fold line 50 extending vertically from its top to its bottom, midway between the front and rear panels. Thus, the spacer 14 may be folded as shown in FIG. 3 to allow the front and rear panels to be placed substantially in face-to-face relationship when it is desired to collapse the viewer. A similar fold line 52 is provided across the center of the bottom panel 16 and forms a horizontal continuation of the fold line 50. As is evident in the drawings, when the viewer is collapsed, the bottom panel 16 folds upwardly along the fold line 52 so that it lies between the panels 10 and 12 while the spacer panel 14 folds to the right as viewed in FIGS. 1 and 3. Thus, the folded spacer panel 14 does not overlap the bottom panel 16 to add to the bulk of the device.

The front panel 12 is provided with a pair of openings 54 through which the picture 30 mounted on the rear panel 10 is viewed. Magnifying lenses 56 are mounted over the openings 54 on the front panel 12 to magnify the size of the object shown in the picture. In the form shown, heavy paper rings are cemented to the rear face of the front panel and overlap the edges of the lenses 56. Obviously other arrangements may be used.

The viewer shown in the drawing is biased to an open position by a spring-like member 58 in the form of an elastic secured at one end to the top surface 60 of the bottom panel 16. The elastic extends about the side edge 62 of the bottom panel and to the bottom of the spacer panel 14 adjacent the fold line 50. The two ends of the elastic may be fastened to the base and spacer panels by split pins 64 as shown in the drawings. It is evident that when the panels 10 and 12 are moved toward one another, the elastic 58 stretches because the pin on the bottom of the spacer panel 14 moves away from the bottom panel 16. The elastic thus constantly urges the spacer panel 14 toward the base panel 16 so that the viewer is fully open as viewed in FIG. 1. When the panels are released to the influence of the elastic, the base panel 16 holds the front and rear panels 10 and 12 in parallel relationship so that the magnification of the lenses is equal on both pictures on the two fields on the rear panel.

The viewer may also include an elastic fastener 66 or some other device which holds the panels 10 and 12 in close proximity with one another. To collapse the viewer the fastener overcomes the bias of the elastic 58.

From the foregoing description it will be appreciated that a viewer made in accordance with this invention is extremely inexpensive to manufacture, is compact and easy to carry, and is rugged enough to withstand substantial abuse without breaking. Made of a material such as corrugated cardboard, the panels will maintain the necessary stiffness and will not fray, rip or otherwise become mutilated. It will also be evident that numerous modifications may be made of this device without departing from the spirit of this invention. Therefore, it is not intended to limit the breadth of this invention to the single embodiment illustrated and described. Rather, it is intended that the scope of this invention be determined by the appended claims and their equivalents.

What is claimed is:
1. A three dimensional viewer comprising
   a picture support panel,
   a front panel spaced from the front of and parallel to the support panel,
   a pair of eye openings in the front panel covered by magnifying lenses through which the support panel may be viewed,
   a spacer panel hingedly secured along its front edge to the front panel and along its rear edge to the support panel, said spacer panel being connected to the front panel between the lenses,
   a bottom panel extending substantially in a plane perpendicular to the front and spacer panels in one position and interconnecting the bottom edges of the support and front panels and hingedly secured thereto,
   fold lines provided in the spacer and bottom panels oriented parallel to the support and viewer panels cooperating with the hinge connections between the spacer and bottom panels and the other panels enabling the support and front panels to be brought closely adjacent one another,
   biasing means connected to at least one of the bottom and spacer panels biasing said panels to unfold along the fold lines and orient the front and support panels parallel to each other,
   said panels being made of a cardboard material with the front, bottom and support panels being integral with one another,
   said bottom panel being confined to one side of the spacer panel,
   said fold line on the bottom panel enabling the bottom panel to fold upwardly between the front and rear panels,
   and said spacer panel fold line enabling that panel to fold away from the bottom panel.

2. A viewer as defined in claim 1 further characterized by
   said biasing means comprising an elastic member secured at one end to the spacer panel and at the other end to the bottom panel yieldably urging the spacer panel toward the bottom panel.

3. A viewer as defined in claim 1 further characterized by
   a slot provided between the rear edge of the spacer panel and the supporting panel enabling a picture mounted on the rear panel to extend to both sides of the spacer panel.

References Cited

UNITED STATES PATENTS

| 906,774 | 12/1908 | Colwell | 350—140 |
| 2,187,765 | 1/1940 | Walter | 350—140 |
| 2,616,333 | 11/1952 | Tinker | 350—140 X |
| 2,715,853 | 8/1955 | Austin | 350—140 |
| 2,930,286 | 3/1960 | Rabben | 350—140 |

FOREIGN PATENTS

| 529,770 | 12/1921 | France. |
| 30,519 | 3/1904 | Switzerland. |

JEWELL H. PEDERSEN, *Primary Examiner.*

O. B. CHEW, *Assistant Examiner.*